(12) United States Patent
Major

(10) Patent No.: US 7,988,543 B2
(45) Date of Patent: Aug. 2, 2011

(54) BATTERY PACK AND HVAC AIR HANDLING AND CONTROLS

(75) Inventor: Gregory A. Major, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1267 days.

(21) Appl. No.: 11/609,349

(22) Filed: Dec. 12, 2006

(65) Prior Publication Data

US 2008/0139102 A1  Jun. 12, 2008

(51) Int. Cl.
*B61D 27/00* (2006.01)
*F25D 23/12* (2006.01)

(52) U.S. Cl. .......................... 454/107; 62/259.2

(58) Field of Classification Search ................ 454/107; 62/259.2

See application file for complete search history.

(56) References Cited

U.S. PATENT DOCUMENTS

| 5,937,664 A * | 8/1999 | Matsuno et al. ............ 62/259.2 |
| 2005/0138941 A1 | 6/2005 | Kikuchi |
| 2007/0089442 A1 | 4/2007 | Tsuchiya |

FOREIGN PATENT DOCUMENTS

EP  1504949 A1  9/2005

* cited by examiner

*Primary Examiner* — Steven McAllister
*Assistant Examiner* — Helena Kosanovic

(57) ABSTRACT

A system and method for controlling air flow through a passenger cabin and battery pack of a vehicle having a battery module is disclosed. A HVAC controller communicates with a battery pack controller to assure that air flow from the passenger cabin through the battery pack, and either out to atmosphere or returned to the passenger cabin, is coordinated to obtain desirable passenger cabin heating/cooling and battery cooling.

11 Claims, 2 Drawing Sheets

BATTERY PACK AND HVAC AIR HANDLING AND CONTROLS

BACKGROUND OF THE INVENTION

The present invention relates generally to a vehicle having a heating ventilation and air conditioning (HVAC) system and an air-cooled battery pack.

Some modern automotive vehicles are propelled by electric motors, whether a hybrid electric vehicle or a pure electric vehicle. These vehicles include battery packs for storing electric charge used to drive the motor. A significant amount of energy flow into and out of the battery pack can occur, which may raise the temperature of the battery pack above levels that are desirable. Consequently, some of these vehicles use various techniques for cooling the battery pack. Given the additional cost and complexity of cooling a battery pack, it is thus desirable to cool it in the most efficient and least costly way possible.

SUMMARY OF THE INVENTION

An embodiment contemplates a vehicle having a passenger cabin with an HVAC module and a battery module having a battery pack. The vehicle may include a recirculation/fresh air door located in the HVAC module and operable to selectively allow variable proportions of fresh air from outside the vehicle and recirculated air from inside the passenger cabin to flow there-past; a HVAC blower, located in the HVAC module, and operable to draw the air past the recirculation/fresh air door and direct the air into the passenger cabin; a HVAC module controller operatively engaging and controlling a position of the recirculation/fresh air door and a speed of the HVAC blower; a battery pack air inlet configured to direct the air from the passenger cabin into the battery pack; a battery pack blower, located in the battery module, and operable to draw in the air through the battery pack air inlet; and a battery pack controller, operative to control a speed of the battery pack blower, and in communication with the HVAC module controller.

An embodiment contemplates a method for controlling air flowing into and out of a passenger cabin of a vehicle and the air flowing through a battery pack of a battery module, the method comprising the steps of: controlling a position of a recirculation/fresh air door located in a HVAC module with a HVAC module controller; controlling a speed of a HVAC blower, located in the HVAC module, with the HVAC module controller; controlling a speed of a battery pack blower, located in the battery module, with a battery pack controller; drawing the air from the passenger cabin through the battery pack with the battery pack blower; and communicating from the HVAC module controller to the battery pack controller to selectively coordinate the speed of the battery pack blower with the speed of the HVAC blower.

An embodiment contemplates a method for cooling a passenger cabin of a vehicle and a battery pack of a battery module while the vehicle is not operating, the method comprising the steps of: controlling a position of a recirculation/fresh air door located in a HVAC module with a HVAC module controller to allow fresh air to be drawn into the passenger cabin; controlling a speed of a battery pack blower, located in the battery module, with a battery pack controller; communicating from the battery pack controller to the HVAC module controller to coordinate the air flow through the passenger cabin; drawing the air from the passenger cabin through the battery pack with the battery pack blower; and exhausting the air from the battery pack blower through an exhaust air outlet to outside of the vehicle.

An advantage of an embodiment is that a positive passenger cabin pressure may be maintained in all HVAC and battery cooling modes.

An advantage of an embodiment is that blower noise in the HVAC module may be reduced without reducing the air flow into the passenger cabin by using the battery pack blower to augment the HVAC blower. Moreover, the blower power may be reduced by using air flow from ram air, when the vehicle speed is high enough.

An advantage of an embodiment is that the blower in the battery pack or HVAC blower may be employed for battery pack and passenger cabin cooling when the vehicle is parked. Thus, even when the vehicle is not operating, the battery (especially during charging) and the passenger cabin can be kept cooler by causing air to flow through them.

An advantage of an embodiment is that the air distribution in the passenger cabin may be improved by drawing air into the battery pack air inlet. This may result in improved cooling capacity of the HVAC module due to more air flow, or improved heating by using battery heat for supplemental heating in the passenger cabin.

DETAILED DESCRIPTION

Figure 1:
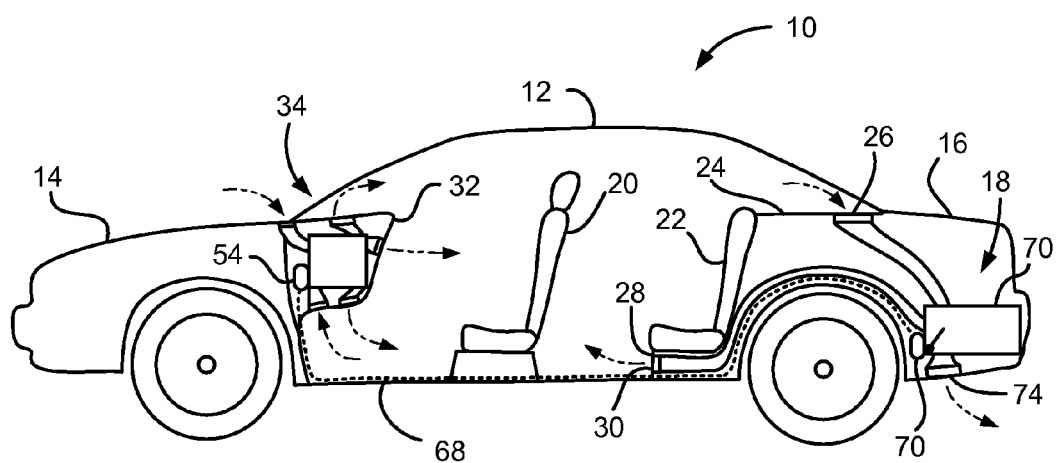
FIG. 1 is a schematic, side view of a vehicle according to an embodiment.
Figure 2:
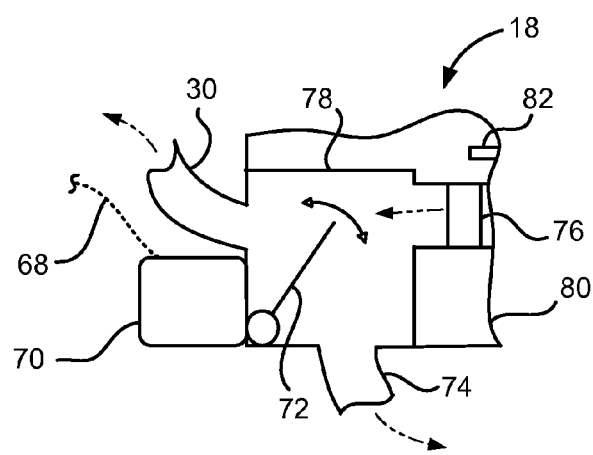
FIG. 2 is a schematic view of an air flow duct and controls adjacent to a vehicle battery pack.
Figure 3:
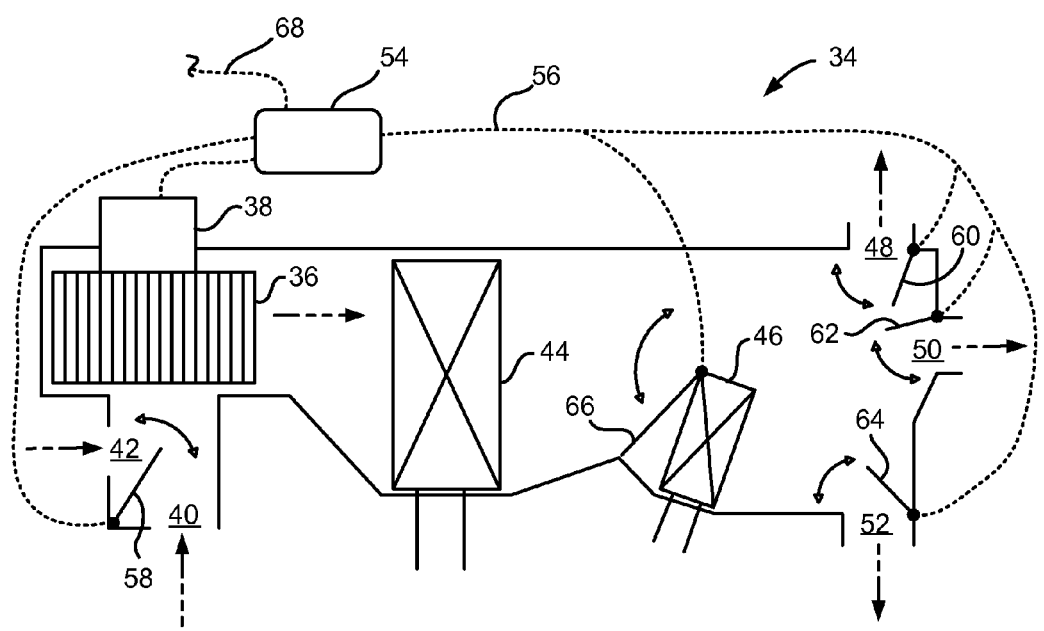
FIG. 3 is a schematic view of a HVAC module and passenger cabin vents.

FIGS. 1-3 illustrate a vehicle 10 according to a first embodiment. The vehicle 10 includes a passenger cabin 12, a front portion 14, which may contain an engine or motor (not shown), and a rear portion 16, which may be a trunk or rear cargo portion and contains a battery module 18. The basic vehicle architecture may be a hybrid electric, electric, or other similar type of vehicle propulsion architecture where a battery module 18 is employed.

The passenger cabin 12 may include front seats 20 and rear seats 22. A package shelf 24 may be mounted behind the rear seats 22 and include a battery pack air inlet 26, which may be designed to allow flow in only one direction—out of the passenger cabin 12. Seat support structure 28 may be located under the rear seats 22 and include a return air outlet 30. An instrument panel 32 may be located in the passenger cabin 12 and include a heating, ventilation and air conditioning (HVAC) module 34 mounted behind or underneath it.

The HVAC module 34 may include a HVAC blower 36, driven by a blower motor 38, that can draw in air from a recirculation air intake 40 and a fresh air intake 42 and direct it toward an evaporator 44. Air directed toward the evaporator 44 may be directed through or around a heater core 46 before being directed through one or more of a defrost vent 48, an upper vent 50 and a foot vent 52.

The HVAC module 34 may also include a HVAC module controller 54 having controller communication lines 56 to a recirculation/fresh air door 58, a defrost door 60, an upper vent door 62, a foot vent door 64, and a heater core door 66. The doors can be electronically controlled to pivot to open, closed or positions in between, to draw in and direct the air where desired, as is known to those skilled in the art. The HVAC module controller 54 may also communicate with the blower motor 38 to cause it to be driven at a desired speed. The communication lines in FIGS. 1-3 are indicated by dashed lines and may carry signals via copper, fiber optic, radio wave transmission, or any other suitable means for transmitting the signals. The HVAC module controller 54 may also communicate with a battery pack controller 70 via a communication line 68.

The battery pack controller 70 may be part of the battery module 18. While the battery pack controller 70 is shown adjacent to a battery pack 80 (discussed below), it may be located somewhere else in the vehicle 10, if so desired. The battery pack controller 70 also controls an exhaust/return air door 72, which controls flow to a return air outlet 30 and an exhaust air outlet 74. A battery pack blower 76 is also controlled by the controller 70. The battery pack blower 76 may be located in the battery pack 80 or separated from the battery pack 80, but connected by an air duct. The blower 76 draws air in through the battery pack air inlet 26, through the battery pack 80, and pushes it into an airflow duct 78, where it is directed out through the return air outlet 30 or the exhaust air outlet 74. The air flow through the battery pack 80 helps remove heat from the battery pack 80. The battery module 18 may also include a temperature sensor 82 that communicates with the battery pack controller 70 to provide input relating to the temperature in the battery pack 80. While the return air outlet 30 directs the air from the battery pack 80 back into the passenger cabin 12, the exhaust air outlet 74 directs the air out of the vehicle 10 into the atmosphere.

One will note that the battery pack 80 is cooled by air drawn from the passenger cabin 12 that flows through it. If the HVAC module 34 is operating, then the air supplied to cool the battery pack 80 is, in effect, supplied by the HVAC module 34. With this overall configuration, the conventional body mounted cabin pressure relief valve (not shown), may be eliminated or designed with flaps that are designed to open at a higher pressure.

The vehicle 10 having the HVAC module 34 and battery module 18 discussed above can be operated in various modes to provide multiple different functions relating to cooling or heating the passenger cabin 12 and cooling the battery pack 80. The possible directions for air flow in the various modes of operation are indicated by the phantom-line arrows shown in FIGS. 1-3. The movement of the various doors, which are employed to direct the air flow, are indicated by the curved double-arrow-ended lines in FIGS. 2 and 3.

Different modes of operating the HVAC module 34 in cooperation with the battery module 18 will now be discussed. By coordinating the operation of the two modules 18, 34, greater operating efficiencies and better performance may be achieved.

A first operating mode is one where the HVAC module 34 is providing typical heating or cooling to the passenger cabin 12, and the battery module 18 is providing cooling to the battery pack 80 and exhausting the air through the exhaust air outlet 74. The HVAC module controller 54 communicates with the battery pack controller 70 to ensure that the battery pack blower 76 will not draw more air than the HVAC blower 36, thus assuring that the passenger cabin 12 will not have a negative pressure (i.e., less than atmospheric). If the battery pack blower 76 needs to draw a larger volume of air to cool the battery pack 80, then the HVAC controller 54 can increase the HVAC blower 36 speed and make any other corresponding adjustments needed to assure that HVAC module 34 maintains the passenger cabin 12 at the desired temperature. If the HVAC module 34 is in a heat operating mode, rather than air conditioning, then the exhaust/return air door 72 may be adjusted to return some or all of the air to the passenger cabin 12. Also, if the HVAC module 34 is in recirculation mode while operating the air conditioner, and battery pack cooling is required, then the HVAC controller 54 can shift the recirculation/fresh air door 58 to less than full recirculation. The amount of fresh air intake would be a function relating to the speeds of the HVAC blower 36 and the battery pack blower 76 in order to assure that a positive pressure is maintained in the passenger cabin 12.

A second operating mode is one where the vehicle 10 is traveling fast enough to have a ram air effect when fresh air is being drawn into the HVAC module 34. This may include a HVAC blower speed reduction that increases with increased vehicle speed. This may also allow for a corresponding decrease in the battery pack blower 76 as well.

A third operating mode is one where a maximum cooling is desired from the HVAC module 34. With the HVAC blower 36 operating at maximum speed, the battery pack blower 76 can be increased in speed (with the exhaust/return air door 72 sending air through the exhaust air outlet 74) in order to maximize the air flow through the passenger cabin 12.

A fourth operating mode is one the where battery pack blower 76 is used to assist the HVAC blower 36 in order to allow the HVAC blower 36 to operate at a lower speed, reducing the noise emanating from the HVAC module 34. That is, when moderate to high blower speeds are needed from the HVAC blower 36, the battery pack blower 76 can be increased in speed to help increase the air flow through the passenger cabin 12, thus reducing the speed at which the HVAC blower 36 needs to operate to obtain the desired heating or cooling effect.

A fifth operating mode is one where improved air distribution throughout the passenger cabin 12—especially to passengers in the rear seats 22—is achieved. When providing air conditioning to the passenger cabin 12, the exhaust/return air door 72 is set to direct air through the exhaust air outlet 74 and the battery pack blower 76 is activated. Thus, the cool air emanating from the HVAC module 34 is drawn past the rear seat passengers as it flows into the battery pack air inlet 26. When providing heat to the passenger cabin 12, the exhaust/return air door 72 is set to direct air through the return air outlet 30 and the battery pack blower 76 is activated. Thus, not only is the warm air emanating from the HVAC module 34 drawn past the rear seat occupants, but the air flowing through the battery pack 80 absorbs heat and is returned to the feet of the rear seat passengers via the return air outlet 30.

A sixth operating mode is one where the battery pack blower 76 is operated when the vehicle is parked and the ambient temperature is high (e.g., the car is parked in the sun on a hot summer day). With the exhaust/return air door 72 set to direct air flow through the exhaust air outlet 74, and the recirculation/fresh air door 58 at least partially open to the fresh air intake 42, the battery pack blower 76 is operated. This will cause air to be drawn in through the fresh air intake 42, through the passenger cabin 12, through the battery pack 80, and out into the atmosphere. The battery pack blower 76 can be operated at a low speed so as to avoid draining the battery pack too much. The small flow of air is sufficient to help reduce the heat build-up in the passenger cabin 12 and battery pack 80. This allows for increased passenger comfort upon entry into the passenger cabin 12 as well as reducing the temperature inside the battery pack 80. This operating mode may also be used if the battery pack 80 is plugged-in for recharging. The air flow through the battery pack 80 will help reduce heat build-up that may occur during battery charging.

A seventh operating mode is one where the battery pack temperature is higher than the passenger cabin 12 and the engine coolant has not warmed enough to allow the heater core 46 to be fully effective. In this operating mode, the exhaust/return air door 72 is moved to direct the air flow through the return air outlet 30 and the battery pack blower 76 is operated. Thus, air is drawn in from the passenger cabin 12 through the battery pack air inlet 26, absorbs heat as it flows through the battery pack 80, and is directed back into the passenger cabin 12 through the return air outlet 30. In effect, a supplemental heat is provided until the heater core 46 can produce the heat needed by the HVAC module 34.

An eighth operating mode is one where the front HVAC module 34 is operating in full recirculation mode, in which case the battery module 18 would be returning the air back into the passenger cabin 12 in order to avoid creating a negative pressure therein. If this occurs while the battery pack 80 has high thermal loads, then the HVAC module controller 54 may coordinate with the battery pack controller 70 to move the recirculation/fresh air door 58 to at least partial fresh air intake 42 and the exhaust/return air door 72 to at least partial exhaust air outlet 74. This will avoid returning excessive heat from the battery pack 80 to the passenger cabin 12 while also avoiding a negative pressure therein.

Figure 4:
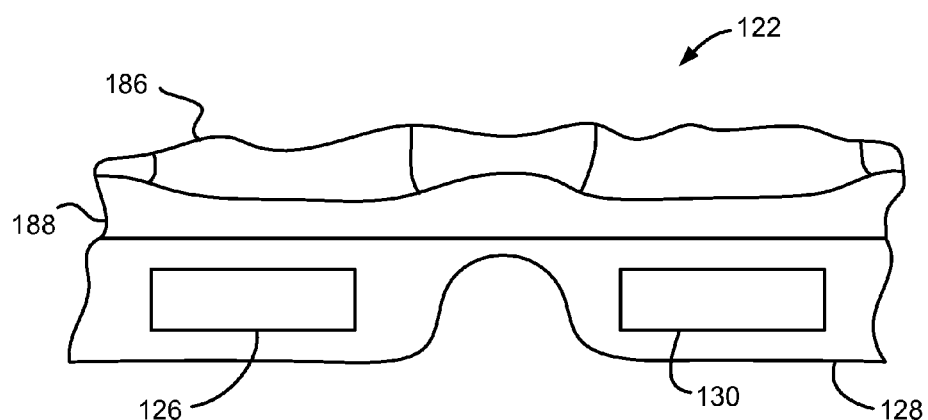
FIG. 4 is a schematic, front view of a portion of a rear vehicle seat according to a second embodiment.

FIG. 4 illustrates a second embodiment. In this embodiment, elements that are similar to those in the first embodiment will have similar element numbers, but in the 100-series. The rear seats 122, having a rear seat back 186 and rear seat bottom 188 supported by a seat support structure 128, may provide for both air intake and return from a battery pack (not shown in this embodiment). A battery pack air intake 126 may be located in the seat support structure 128 (rather than in the package shelf), and a return air outlet 130 may also be located in the seat support structure 128, spaced from the intake 126. This may be more practical for vehicles having a rear cargo space rather than a rear package shelf and trunk.

For another alternative embodiment (not shown), the air may be drawn into the battery pack from the package shelf or from under the rear seat, with the air returning from the battery pack directed through the package shelf back into the passenger cabin. In yet another alternative embodiment (not shown), for vehicles having a rear cargo area rather than trunk and package shelf, such as in a station wagon or other similar type of vehicle, the battery pack air inlet and return air outlet may be in one or both side walls of this rear cargo area. And, of course, the battery pack can be located above or below a vehicle floor pan, as is desired for the particular vehicle configuration.

While certain embodiments of the present invention have been described in detail, those familiar with the art to which this invention relates will recognize various alternative designs and embodiments for practicing the invention as defined by the following claims.

What is claimed is:

1. A vehicle having a passenger cabin with an HVAC module and a battery module having a battery pack comprising:
   a recirculation/fresh air door located in the HVAC module and operable to selectively allow variable proportions of fresh air from outside the vehicle and recirculated air from inside the passenger cabin to flow there-past;
   a HVAC blower, located in the HVAC module, and operable to draw the air past the recirculation/fresh air door and direct the air into the passenger cabin;
   a HVAC module controller operatively engaging and controlling a position of the recirculation/fresh air door and a speed of the HVAC blower;
   a battery pack air inlet configured to direct the air from the passenger cabin into the battery pack;
   a battery pack blower, located in the battery module, and operable to draw in the air through the battery pack air inlet; and
   a battery pack controller, operative to control a speed of the battery pack blower, and in communication with the HVAC module controller; and
   wherein the HVAC module controller and the battery pack controller are configured to operate the HVAC blower at a first speed to provide a desired amount air flow to the passenger cabin from the HVAC module to provide one of heating and cooling the passenger cabin; reduce the HVAC blower to a second speed that is less than the first speed; and increase a speed of the battery pack blower at essentially the same time as the HVAC blower speed is reduced to the second speed in order to maintain a desired amount of air flow to the passenger cabin from the HVAC module.

2. The vehicle of claim 1 comprising:
   a return air outlet configured to direct the air from the battery pack into the passenger cabin;
   an exhaust air outlet configured to direction the air from the battery pack out of the vehicle; and
   an exhaust/return air door located in the battery module and operable to selectively allow variable proportions of the air flowing from the battery pack to flow into the return air outlet and the exhaust air outlet.

3. The vehicle of claim 2 wherein the battery pack controller is operative to control a position of the exhaust/return air door.

4. The vehicle of claim 2 wherein the passenger cabin includes a seat support structure and the return air outlet operatively engages the seat support structure.

5. The vehicle of claim 2 wherein the battery pack controller is operable to move the exhaust/return air door into the position blocking the exhaust air outlet when the HVAC module controller communicates that the recirculation/fresh air door is in the position blocking the flow of the fresh air from outside the vehicle.

6. The vehicle of claim 1 wherein the passenger cabin includes a package shelf and the battery pack air inlet operatively engages the package shelf.

7. The vehicle of claim 1 wherein the passenger cabin includes a seat support structure and the battery pack air inlet operatively engages the seat support structure.

8. A method for controlling air flowing into and out of a passenger cabin of a vehicle and the air flowing through a battery pack of a battery module, the method comprising the steps of:
   (a) controlling a position of a recirculation/fresh air door located in a HVAC module with a HVAC module controller;
   (b) controlling a speed of a HVAC blower, located in the HVAC module, with the HVAC module controller;
   (c) controlling a speed of a battery pack blower, located in the battery module, with a battery pack controller;
   (d) drawing the air from the passenger cabin through the battery pack with the battery pack blower;
   (e) communicating from the HVAC module controller to the battery pack controller to selectively coordinate the speed of the battery pack blower with the speed of the HVAC blower;
   (f) operating the HVAC blower at a first speed to provide a desired amount air flow to the passenger cabin from the HVAC module to provide one of heating and cooling the passenger cabin;

(g) reducing the HVAC blower to a second speed that is less than the first speed; and (h) increasing a speed of the battery pack blower at essentially the same time as step (g) in order to maintain the desired amount of air flow to the passenger cabin from the HVAC module.

9. The method of claim 8 comprising the steps of:

(i) controlling a position of an exhaust/return air door located in the battery module with the battery pack controller; and (j) moving the exhaust/return air door to direct all of the air flow from the battery pack back into the passenger cabin when the position of the recirculation/fresh air door is such that all of the air drawn into the HVAC blower is from the passenger cabin.

10. The method of claim 8 comprising the steps of:

(i) operating the HVAC module in a heating mode;

(j) determining if a temperature in the battery pack is higher than a temperature in the passenger cabin; and (k) moving the exhaust/return air door to direct all of the air flow from the battery pack back into the passenger cabin if determined that the temperature of the battery pack is higher than the temperature in the passenger cabin, thereby providing supplemental heat to the passenger cabin.

11. The method of claim 8 comprising the steps of:

(i) operating the HVAC module in an air conditioning mode;

(j) moving the recirculation/fresh air door to direct at least a portion of the air flowing into the HVAC blower from outside the vehicle;

(k) moving the exhaust/return air door to direct all of the air flow from the battery pack out of the vehicle; and (l) operating the HVAC blower and the battery pack blower to direct the air from outside the vehicle, through the HVAC module, through the passenger cabin, through the battery pack and out of the vehicle.

* * * * *